United States Patent
Lopez et al.

(10) Patent No.: US 7,211,536 B2
(45) Date of Patent: May 1, 2007

(54) SUPPORTED METALLOCENE CATALYSTS AND THEIR USE IN PRODUCING STEREOSPECIFIC POLYMERS

(75) Inventors: Margarito Lopez, Pasadena, TX (US); Edwar Shamshoum, Greensboro, NC (US); Donald Gordon Campbell, Jr., Webster, TX (US)

(73) Assignee: Fina Technology, Inc., Houston, TX (US)

( * ) Notice: Subject to any disclaimer, the term of this patent is extended or adjusted under 35 U.S.C. 154(b) by 110 days.

(21) Appl. No.: 10/971,362

(22) Filed: Oct. 22, 2004

(65) Prior Publication Data

US 2006/0089470 A1    Apr. 27, 2006

(51) Int. Cl.
*B01J 21/16*    (2006.01)

(52) U.S. Cl. .............. 502/120; 502/132; 502/152; 502/527; 526/129; 526/160; 526/165; 526/943

(58) Field of Classification Search .............. 526/129, 526/160, 165, 943; 502/120, 132, 152, 527
See application file for complete search history.

(56) References Cited

U.S. PATENT DOCUMENTS

| | | | |
|---|---|---|---|
| 4,701,432 A | 10/1987 | Welborn, Jr. | |
| 4,794,096 A | 12/1988 | Ewen | |
| 4,808,561 A | 2/1989 | Welborn, Jr. | |
| 4,892,851 A | 1/1990 | Ewen et al. | |
| 4,975,403 A | 12/1990 | Ewen | |
| 5,026,798 A | 6/1991 | Canich | |
| 5,036,034 A | 7/1991 | Ewen | |
| 5,225,500 A | 7/1993 | Elder et al. | |
| 5,238,892 A | 8/1993 | Chang | |
| 5,243,002 A | 9/1993 | Razavi | |
| 5,281,679 A | 1/1994 | Jejelowo et al. | |
| 5,308,811 A | 5/1994 | Suga et al. | |
| 5,387,568 A | 2/1995 | Ewen et al. | |
| 5,399,636 A | 3/1995 | Alt et al. | |
| 5,444,134 A | 8/1995 | Matsumoto | |
| 5,466,649 A | 11/1995 | Jejelowo | |
| 5,498,581 A | 3/1996 | Welch et al. | |
| 5,763,549 A | 6/1998 | Elder et al. | |
| 6,166,153 A | 12/2000 | Shamshoum et al. | |
| 6,239,058 B1 | 5/2001 | Shamshoum et al. | |
| 6,432,860 B1 * | 8/2002 | Shamshoum et al. | 502/103 |
| 6,777,366 B2 | 8/2004 | Gauthier et al. | |
| 6,777,367 B2 | 8/2004 | Gauthier et al. | |

FOREIGN PATENT DOCUMENTS

| | | |
|---|---|---|
| EP | 0 277 003 A1 | 8/1988 |
| EP | 0 277 004 A1 | 8/1988 |
| EP | 0 819 706 A1 | 1/1998 |
| EP | 0 856 525 A1 | 8/1998 |
| EP | 1038885 A2 * | 9/2000 |

* cited by examiner

*Primary Examiner*—Caixia Lu
(74) *Attorney, Agent, or Firm*—Tenley R. Krueger; William D. Jackson (57) ABSTRACT

Supported stereospecific catalysts and processes for the stereotactic propagation of a polymer chain derived from ethylenically unsaturated monomers which contain three or more carbon atoms or which are substituted vinyl compounds, specifically alpha olefins, particularly the polymerization of propylene to produce syndiotactic or isotactic polypropylene. The supported metallocene catalyst comprises a stereospecific metallocene catalyst and a co-catalyst component comprising at least one of an alkyl alumoxane and an alkylaluminum compound. Both the metallocene catalyst and the co-catalyst are supported on a particulate silica support comprising silica particles having an average particle size of 5–40 microns and an average effective pore size of 50–200 angstroms. The silica support further has a differential pore size distribution of a pore volume of at least 0.01 $cm^3/g$. within a range having a maximum pore width of no more than 300 angstroms. The metallocene has a retention factor on this support of at least 90 wt. % after aging in tri-isobutylaluminum at a temperature of 25° C. for a period of 12 hours.

7 Claims, 6 Drawing Sheets

SUPPORTED METALLOCENE CATALYSTS AND THEIR USE IN PRODUCING STEREOSPECIFIC POLYMERS

FIELD OF THE INVENTION

This invention relates to supported stereorigid metallocene catalysts useful in the production of stereospecific polymers from ethylenically unsaturated compounds and more particularly, to such catalysts incorporating crystalline silica supports and their use.

BACKGROUND OF THE INVENTION

Numerous catalyst systems for use in the polymerization of ethylenically unsaturated monomers are based upon metallocenes. Metallocenes can be characterized generally as coordination compounds incorporating one or more cyclopentadienyl groups (which may be substituted or unsubstituted) coordinated with a transition metal. Various types of metallocenes are known in the art. They include bicyclic coordination compounds of the general formula:

$$(Cp)_2MeQn \qquad (1)$$

characterized by the isospecific metallocenes as described below and dicyclopentadienyl compounds of the general formula:

$$Cp\ Cp'MeQn \qquad (2)$$

characterized by the syndiospecific metallocenes described below. In the aforementioned formulas the Me denotes a transition metal and Cp and Cp' each denote a cyclopentadienyl group which can be either substituted or unsubstituted with Cp' being different from Cp, Q is an alkyl or other hydrocarbyl group or a halogen and n is a number within the range of 1–3. The cyclopentadienyl groups are in a stereorigid relationship normally provided by a bridged structure between the metallocene rings (not shown in Formulas (1) and (2) above) although stereorigidity can be provided through substituent groups which result in steric hindrance, as described, for example, in U.S. Pat. No. 5,243,002 to Razavi. Also, while bridged metallocenes normally incorporate two cyclopentadienyl groups (or substituted cyclopentadienyl groups), bridged metallocenes incorporating a single cyclopentadienyl group which is bridged to a heteroatom aromatic group (both being coordinated with a transition metal) are also known in the art. For example, U.S. Pat. No. 5,026,798 to Canich discloses dimethylsilyl-bridged cyclopentadienyl—anilino or other heteroatom ligand structures with coordination to the transition metal being provided through the nitrogen atom of the anilino group.

As noted previously, isospecific and syndiospecific metallocene catalysts are useful in the polymerization of stereospecific propagation of monomers. Stereospecific structural relationships of syndiotacticity and isotacticity may be involved in the formation of stereoregular polymers from various monomers. Stereospecific propagation may be applied in the polymerization of ethylenically unsaturated monomers such as $C_3+$ alpha olefins, 1-dienes such as 1,3-butadiene, substituted vinyl compounds such as vinyl aromatics, e.g, styrene or vinyl chloride, vinyl chloride, vinyl ethers such as alkyl vinyl ethers, e.g., isobutyl vinyl ether, or even aryl vinyl ethers. Stereospecific polymer propagation is probably of most significance in the production of polypropylene of isotactic or syndiotactic structure.

The structure of isotactic polypropylene can be described as one having the methyl groups attached to the tertiary carbon atoms of successive monomeric units falling on the same side of a hypothetical plane through the main chain of the polymer, e.g., the methyl groups are all above or below the plane. Using the Fisher projection formula, the stereochemical sequence of isotactic polypropylene is described as follows:

(3)

In structure (3) each vertical segment indicates a methyl group on the same side of the polymer backbone. Another way of describing the structure is through the use of NMR. Bovey's NMR nomenclature for an isotactic pentad as shown above is . . . mmmm . . . with each "m" representing a "meso" dyad, or successive pairs of methyl groups on the same said of the plane of the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the chain lie on alternate sides of the plane of the polymer. Syndiotactic polypropylene in using the Fisher projection formula can be indicated by racemic dyads with the syndiotactic pentad rrrr shown as follows:

(4)

Here, the vertical segments again indicate methyl groups in the case of syndiotactic polypropylene, or other terminal groups, e.g. chloride, in the case of syndiotactic polyvinyl chloride, or phenyl groups in the case of syndiotactic polystyrene.

Syndiotactic polymers are semi-crystalline and, like the isotactic polymers, are insoluble in xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product.

Yet another polymer configuration which has both isotactic and atactic features is exemplified by hemi-isotactic polypropylene. Hemi-isotactic polypropylene is characterized by every other methyl group being on the same side of the polymer with the remaining methyl groups randomly being on the same side or on the opposite side of the polymer backbone. Hemi-isotactic polypropylene can be characterized by the following Fisher projection formula in which, as indicated by the broken lines, alternate methyl groups have random steric configurations.

(5)

Thus, as shown in structure (5), the methyl groups indicated by the solid lines are in a mesa relationship with one another, with the alternating methyl groups indicated by the broken lines being randomly configured. Hemi-isotactic polypropylene, while having a semi-ordered structure, is primarily non-crystalline because of the disorder of the alternate methene units.

In most cases, the preferred polymer configuration will be a predominantly isotactic or syndiotactic polymer with very little atactic polymer. Catalysts that produce isotactic polyolefins are disclosed in U.S. Pat. Nos. 4,794,096 and 4,975,403. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes which may be characterized by the following formula:

$$R''(C_5(R')_4)_2 HfQp \qquad (6)$$

In formula (7), $(C_5(R')_4)$ is a cyclopentadienyl or substituted cyclopentadienyl group, R' is independently hydrogen or a hydrocarbyl radical having 1–20 carbon atoms, and R'' is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

Catalysts that produce syndiotactic polypropylene or other syndiotactic polyolefins and methods for the preparation of such catalysts are disclosed in the aforementioned U.S. Pat. No. 4,892,851. These catalysts are also bridged stereorigid metallocene catalysts, but in this case, the catalysts have a structural bridge extending between dissimilar cyclopentadienyl groups and may be characterized by the formula:

$$R''(CpR_n) (CpR'_m)MeQ_k \qquad (7)$$

In formula (7), Cp represents a cyclopentadienyl or substituted cyclopentadienyl ring, and R and R' represent hydrocarbyl radicals having 1–20 carbon atoms. R'' is a structural bridge between the rings imparting stereorigidity to the catalyst. Me represents a transition metal, and Q a hydrocarbyl radical or halogen. $R'_m$ is selected so that $(CpR'_m)$ is a sterically different substituted cyclopentadienyl ring that $(CpR_n)$. In formula (8) n varies from 0–4 (0 designating no hydrocarbyl groups, i.e., an unsubstituted cyclopentadienyl ring), m varies from 1–4, and k is from 0–3. The sterically different cyclopentadienyl rings produce a predominantly syndiotactic polymer rather than an isotactic polymer. Like their isospecific counterparts, the syndiospecific metallocene disclosed in the '851 patent are used in combination with aluminum co-catalysts. The aluminum co-catalyst may take the form of an alumoxane and trialkyl aluminum or mixtures thereof. Specifically disclosed in the '851 patent is methylalumoxane and triethylaluminum (TEAL).

Specifically disclosed in U.S. Pat. No. 4,892,851 are bridged metallocene ligands having a dissimilar cyclopentadienyl group resulting from the reaction of 6,6-dimethyl fulvene with a substituted cyclopentadiene fluorene to produce a ligand characterized by an isopropylidene bridge structure. Preferably, this ligand structure is characterized as having bilateral symmetry such as indicated by the isopropylidene(cyclopentadienyl fluorenyl) structure as shown below:

(8)

As indicated by formula (8), the bilateral symmetry of the ligand structure is indicated by the balanced orientation about the broken line representing a plane of symmetry extending generally through the bridge structure and the transition metal atom.

The foregoing structure may be contrasted with a metallocene which lacks bilateral symmetry which can be used in the production of hemi-isotactic polypropylene as described in the U.S. Pat. No. 5,036,034 to Ewen. An example of a compound indicating a lack of bilateral symmetry is isopropylidene (3-methyl cyclopentadienyl-1 fluorenyl) zirconium dichloride having the ligand structure shown by the following formula:

(9)

As explained in more detail in the aforementioned Ewen '034 patent, the lack of bilateral symmetry is indicated by the right side of the structure relative to the broken line being different from the left side because of the methyl group substituted at the distal position on the cyclopentadienyl group.

The various metallocene structures as described above can be used either as so-called "neutral metallocenes" in which case an alumoxane, such as methylalumoxane, is used as a co-catalyst, or they can be employed as so-called "cationic metallocenes" which incorporate a stable non-coordinating anion and normally do not require the use of an alumoxane. Syndiospecific cationic metallocenes are disclosed for example in U.S. Pat. No. 5,243,002 to Razavi. As disclosed there, the metallocene cation is characterized by the cationic metallocene ligand having sterically dissimilar ring structures which are joined to a positively-charged coordinating transition metal atom. The metallocene cation is associated with a stable non-coordinating counter-anion. Co-catalysts, such as disclosed in the aforementioned Ewen '851 and Ewen '034 patents, may also be employed with cationic metallocenes such as disclosed in the Razavi '002 patent. As disclosed in Razavi, alumoxanes such as methylalumoxanes normally will not be employed. However, alkyl aluminums, such as TEAL described previously, and other co-catalysts, such as trimethylaluminum, trialkoxy aluminums, dialkylaluminum halides, or alkylaluminum dihalides, may be employed as disclosed in the Razavi '002 patent.

The aforementioned Razavi '002 patent also discloses the establishment of a stereorigid relationship imparted by a sterically hindered relationship between substituted cyclopentadienyl rings which prevent rotation of the ring structures about their coordination axis. Alternatively, the cyclopentadienyl groups may be highly substituted such that a relatively low kinetic energy state is induced by the substituents in order to prevent rotation rings about their coordination axis at the temperature of the catalyst. Such cationic metallocenes also may, of course, like their neutral counterparts, be characterized by a stereorigid relationship imparted by means of a structural bridge between the cyclopentadienyl groups.

U.S. Pat. No. 5,225,500 to Elder et al. discloses stereorigid cationic metallocenes, including, inter alia, bridged metallocene catalysts useful for the production of syndiotactic polymers. The bridged metallocene catalysts of U.S. Pat. No. 5,225,500 comprise an unbalanced metallocene cation and a stable, non-coordinating counteranion for the metallocene cation. The metallocene cation is characterized by a cationic metallocene ligand having sterically dissimilar ring structures joined to a positively charged coordinating transition metal atom. The dissimilar cyclopentadienyl rings, at least one of which is substituted, are both in a stereorigid relationship relative to the coordinating metallocene of the metal atom catalyst, and, as noted previously, the stereorigid relationship may be imparted by means of a structural bridge between the dissimilar cyclopentadienyl rings.

While metallocene catalysts are often used as homogeneous catalysts, it is also known in the art to provide supported metallocene catalysts. As disclosed in U.S. Pat. Nos. 4,701,432 and 4,808,561, both to Welborn, a metallocene catalyst component may be employed in the form of a supported catalyst. As described in the Welborn '432 patent, the support may be any support such as talc, an inorganic oxide, or a resinous support material such as a polyolefin. Specific inorganic oxides include silica and alumina, used alone or in combination with other inorganic oxides such as magnesia, titania, zirconia and the like. Non-metallocene transition metal compounds, such as titanium tetrachloride, are also incorporated into the supported catalyst component. The inorganic oxides used as support are characterized as having an average particle size ranging from 30–600 microns, preferably 30–100 microns, a surface area of 50–1,000 m$^2$/g, preferably 100–400 m$^2$/g, a pore volume of 0.5–3.5 cm$^3$/g, preferably about 0.5–2 cm$^3$/g. Generally, the particle size, surface area, pore volume, and number of surface hydroxyl groups are said to be not critical to the Welborn procedure. Specifically disclosed in Welborn is a catalyst in which bis(cyclopentadienyl)zirconium dichloride (unbridged metallocene) is supported on a high surface area silica dehydrated in dry nitrogen at 600° C. and characterized as Davison D-952. The Welborn '561 patent discloses a heterogeneous catalyst which is formed by the reaction of a metallocene and an alumoxane in combination with the support material. The support in Welborn '561 is described similarly as the support in the Welborn '432 patent. A catalyst system embodying both a homogeneous metallocene component and a heterogeneous component, which may be a "conventional" supported Ziegler-Natta catalyst, e.g. a supported titanium tetrachloride, is disclosed in U.S. Pat. No. 5,242,876 to Shamshoum et al. Various other catalyst systems involving supported metallocene catalysts are disclosed in U.S. Pat. Nos. 5,308,811 to Suga et al. and 5,444,134 to Matsumoto. In both patents, the supports are characterized as various high surface area inorganic oxides or clay-like materials. In the patent to Suga et al., the support materials are characterized as clay minerals, ion-exchanged layered compounds, diatomaceous earth, silicates or zeolites. As explained in Suga, the high surface area support materials should have volumes of pores having radii of at least 20 angstroms. Specifically disclosed and preferred in Suga are clay and clay minerals such as montmorillonite. The catalyst components in Suga are prepared by mixing the support material, the metallocene, and an organoaluminum compound such as triethylaluminum, trirethylaluminum, various alkylaluminum chlorides, alkoxides, or hydrides or an alumoxane such as methylalumoxane, ethylalumoxane, or the like. The three components may be mixed together in any order, or they may be simultaneously contacted. The patent to Matsumoto similarly discloses a supported catalyst in which the support may be provided by inorganic oxide carriers such as $SiO_2$, $Al_2O_3$, MgO, $ZrO_2$, $TiO_2$, $Fe_2O_3$, $B_2O_2$, CaO, ZnO, BaO, $ThO_2$ and mixtures thereof, such as silica alumina, zeolite, ferrite, and glass fibers. Other carriers include $MgCl_2$, $Mg(0\text{-}Et)_2$, and polymers such as polystyrene, polyethylene, polypropylene, substituted polystyrene and polyarylate, starches, and carbon. The carrier has a surface area of 1–1,000 m$^2$/g, preferably 50–500 m$^2$/g, a pore volume of 0.1–5 cm$^3$/g, preferably 0.3–3 cm$^3$/g, and a particle size of 20–100 microns.

Of the various inorganic oxides used as supports, silica, in one form or another, is widely disclosed as a support material for metallocene catalysts. Silica, characterized as Davison D-948 or Davison D-952, appears as a conventional metallocene support. For example, U.S. Pat. No. 5,466,649 to Jejelowa discloses the use of dehydrated Davison D-948 silica as a support for various unbridged metallocenes used in conjunction with supported co-catalysts. U.S. Pat. No. 5,498,581 to Welch et al. discloses silica for use as a support for either bridged or unbridged metallocenes in which the silica is treated with carbon monoxide, water, and hydroxyl groups to inactive species. Specifically disclosed is the silica, Davison D-948, having an average particle size of 50 microns. Other silica-based supports are disclosed in U.S. Pat. Nos. 5,281,679 to Jejelowa, 5,238,892 to Chang, and 5,399,636 to Alt. The Chang and Jejelowa patent disclose the use of a silica support identified as Davison D-948, which is characterized as an amorphous silica gel containing about 9.7 wt. % water. As described in the Chang and Jejelowa patents, alumoxane is formed directly on the surface of the silica gel by direct reaction of an alkyl aluminum with silica gel which is undehydrated so as to ensure the conversion of the quantity of the alkyl aluminum to an alumoxane that has a high degree of oligomerization. The water-impregnated gel is characterized as having a surface range of 10–700 m$^2$/g, a pore volume of about 0.5–3 cm$^3$/g, and an absorbed water content of from about 10–50 wt. % in the case of the Jejelowa patent, and about 6–20 wt. % in the case of the Chang patent. The average particle size for the silica is described in Chang to be from 0.3–100 microns and in Jejelowa from about 10–100 microns. After the alumoxane silica gel component has been formed, the metallocene may be added to the wet slurry.

Other supported catalyst systems are disclosed in U.S. Pat. No. 6,166,153 to Shamshoum et al. Here, a silica support such as described above is pretreated with an alumoxane, such as methylalumoxane, followed by addition of a syndiospecific metallocene on the MAO-treated silica. The supported metallocene is used in conjunction with an organo-aluminum co-catalyst such as a monoalkyl or dialkyl aluminum halides as described previously, including trialkylaluminums such as trimethylaluminum, triethylaluminum or tri-isobutyl aluminum (TIBAL). In the supported catalyst disclosed in EP 819706, the silica support is a high surface area, small pore size silica which is first dried, slurried in a non-polar solvent, and then contacted with methylalumoxane in a solvent. The metallocene was then dissolved in a non-polar solvent, particularly the same as used as the solvent for the alumoxane. The solid metallocene supported on the alumoxane-treated silica is then recovered from the solvent, dried, and then incorporated into carrier liquid such as mineral oil. The Shamshoum European application also discloses a pre-polymerization step which can be used to decrease the aging time of the catalyst in the trialkyl aluminum or other aluminum co-catalyst.

SUMMARY OF THE INVENTION

In accordance with the present invention, there are provided supported stereospecific catalysts and processes for the stereotactic propagation of a polymer chain derived from ethylenically unsaturated monomers which contain three or more carbon atoms or which are substituted vinyl compounds, such as styrene and vinyl chloride. The preferred application of the present invention is in the stereospecific propagation of $C_3$–$C_4$ alpha olefins, particularly the polymerization of propylene to produce syndiotactic or isotactic polypropylene. In carrying out the present invention, there is provided a supported metallocene catalyst comprising a stereospecific metallocene catalyst component and a co-catalyst component comprising at least one of an alkyl alumoxane and an alkylaluminum compound. The metallocene catalyst compound incorporates a metallocene ligand structure having two sterically dissimilar cyclopentadienyl ring structures coordinated with the central transition metal atom. At least one of the cyclopentadienyl ring structures is a substituted cyclopentadienyl group which provides an orientation with respect to said transition metal atom which is sterically different from the orientation of the other cyclopentadienyl group. Both of the cyclopentadienyl groups are in a relationship with one another by virtue of bridge or substituent groups, which provide a stereorigid relationship relative to the coordinating transition metal atom to prevent rotation of said ring structures. Both the metallocene catalyst component and the co-catalyst component are supported on a particulate silica support comprising silica particles having an average particle size within the range of 5–40 microns and an average effective pore size within the range of 50–200 angstroms. The silica support further has a differential pore size distribution of a pore volume of at least 0.01 $cm^3/g$. within a range having a maximum pore width of no more than 300 angstroms. The metallocene is characterized as having a retention factor on this support of at least 90 wt. % after aging in tri-isobutylaluminum at a temperature of 25° C. for a period of 12 hours. Preferably, the maximum differential pore volume correlates with a pore width of less than 200 angstroms. The particulate silica support contains at least 50 wt. % of the supported catalyst component within the pore volume of the silica support. This supported catalyst is contacted in a polymerization reaction zone with an ethylenically unsaturated monomer which contains 3 or more carbon atoms or which is a substituted vinyl compound under polymerization conditions to produce syndiospecific polymerization of the monomer.

In a preferred embodiment of the invention, a supported metallocene catalyst incorporates a particulate silica support having an average diameter and effective pore size as described previously. The particulate spheroidal particles have at least 50% of the surface area thereof contained within the pore volume of the support particles. A stereospecific metallocene is supported on the silica support particles. In one application of the invention, the metallocene is an unbalanced metallocene having a ligand structure in which stereorigidity is imparted by means of a structural bridge extending between dissimilar cyclopentadienyl groups. The metallocene ligand structure has a kinetic diameter which is substantially less than the average pore size of the silica. The metallocene is preferentially is carried within the interior pore volume of the silica particles to provide at least 50 wt. % of the polymerization sites provided on the transitional metal atom within the interior pore volume of the support.

Embodiments further include a process for the preparation of a supported metallocene catalyst. Such process generally includes providing a particulate including silica particles having an average particle size within the range of 20–40 microns, an average effective pore size within the range of 50–200 angstroms, and a differential pore size distribution of a pore volume of at least 0.01 $cm^3/g$ within the range of no more than 300 angstroms, said metallocene having a retention factor on said support of at least 90% after aging in tributylaluminum at a temperature of 25° C. for a period of 12 hours. The process further includes contacting said particulate silica support with an oleaginous solution of an alumoxane co-catalyst in an oleaginous carrier liquid in an amount sufficient to incorporate said alumoxane catalyst within the pore spaces of said silica support and drying said alumoxane-impregnated silica support to remove oleaginous carrier liquid therefrom to leave an alumoxane residue within the pore spaces of said support. Thereafter, the process includes contacting said alumoxane-containing silica support with a stereospecific metallocene having two sterically dissimilar cyclopentadienyl ring structures coordinated with a central transition metal atom being in a stereorigid relationship relative to said coordinating transition metal atom to prevent relative rotation of such ring structures.

DETAILED DESCRIPTION OF THE INVENTION

The present invention involves processes for supported stereospecific metallocenes which may be neutral or cationic, and which are effective in stereospecific polymer propagation, including syndiotactic or isotactic polymer propagation, to provide polymer structure having reduced gel imperfections without reactor fouling due to metallocene desorption from the support. As indicated previously, the metallocene-type catalysts, like the more traditional Ziegler-Natta catalysts, can be supported on various inorganic supports. When supporting traditional Ziegler-Natta-type catalysts, such as zirconium, hafnium, and titanium tetrahalides on crystalline materials, such as magnesium dichloride, it is conventional to "activate" the support material to provide particles of a large surface area on which the transition metal sites are exposed for the polymerization reaction in which the monomer units are incorporated into the growing polymer chain. Similar thinking has dominated the use of supports for metallocene catalysts. Thus, high surface area materials are thought to be desirable and where microporous materials are employed, silica being the principal one of such material, relatively large pore spaces in relationship to the kinetic size of the metallocene ligand are thought to be desirable. Thus, as explained in the aforementioned patent to Suga et al., the pore volume of the support material should be provided by pores having a radii of at least 20 angstroms. Since all things being equal, a higher pore volume correlates with a lower surface area, the traditional silica supports are able to provide relatively high surface areas with acceptable pore volumes because of the irregular angular nature of the silica particles. As described in greater detail below, such silica particles can be characterized as highly irregular polygons with many irregular surface facets and acute angles between intersecting surfaces.

Figure 1:
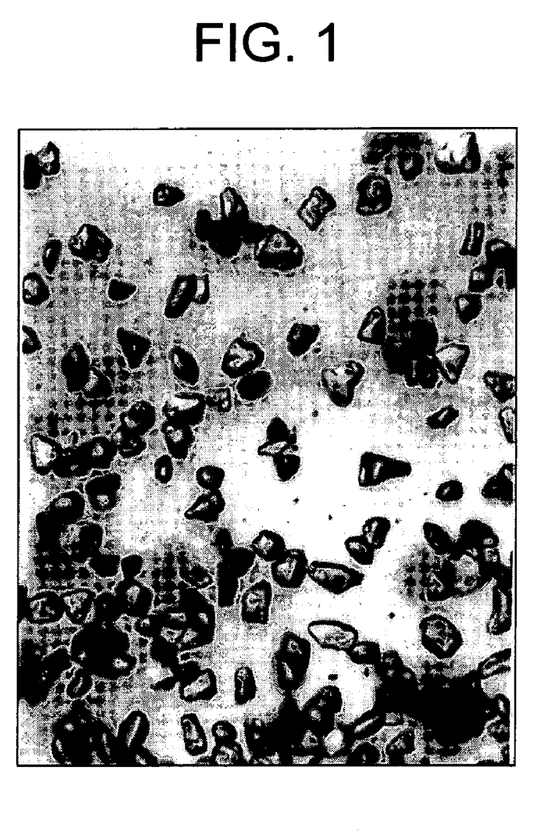
FIG. 1 is a photograph of angular of angular silica particles exemplary of a silica support denominated as Support I.
Figure 2:
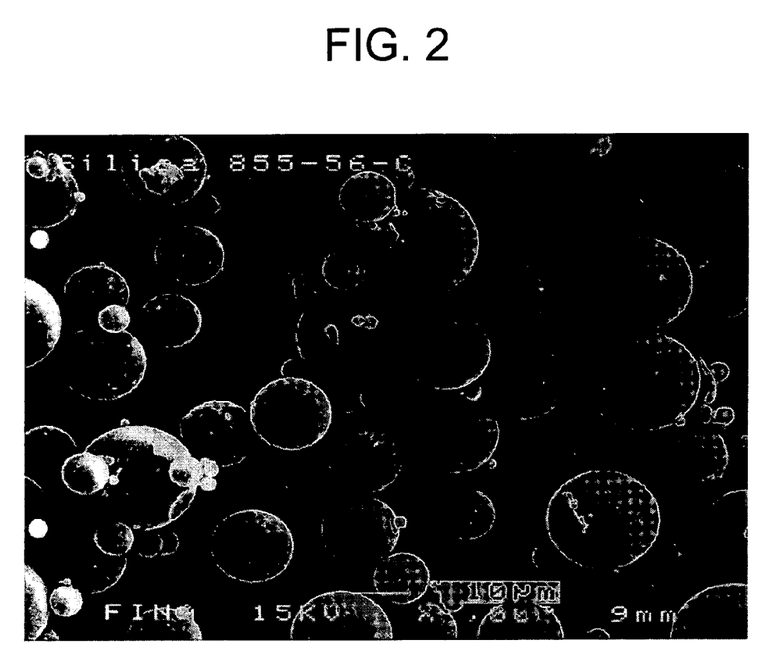
FIGS. 2 and 3 are photographs of spherical silica particles exemplary of a silica support denominated herein as Support II.
Figure 3:
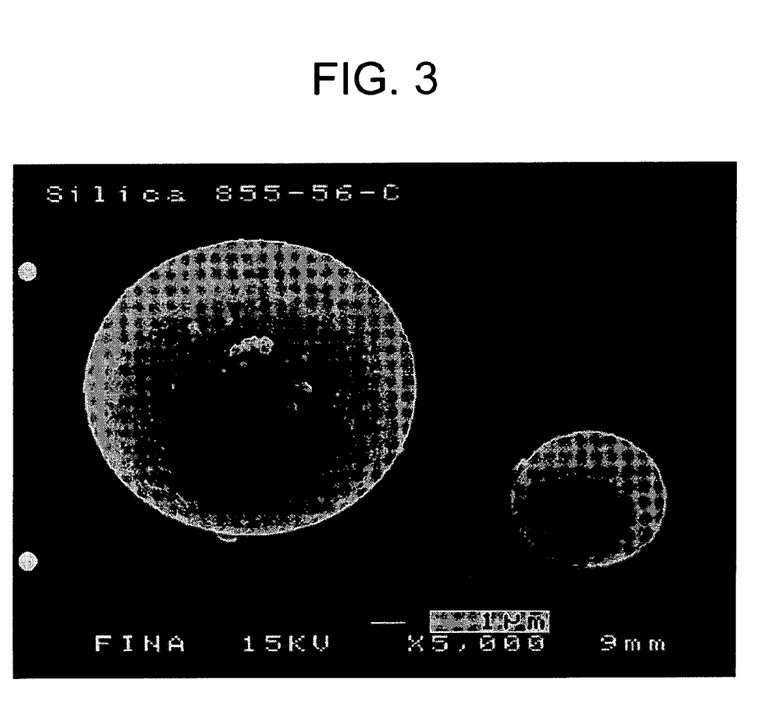
Figure 4:
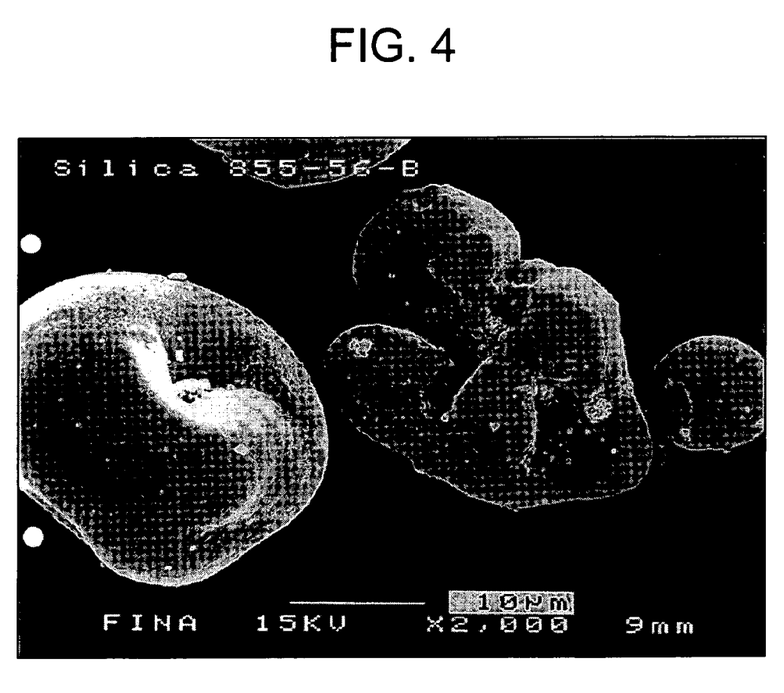
FIGS. 4 and 5 are photographs are semi-spherical silica particles exemplary of a silica support denominated as Support III.
Figure 5:
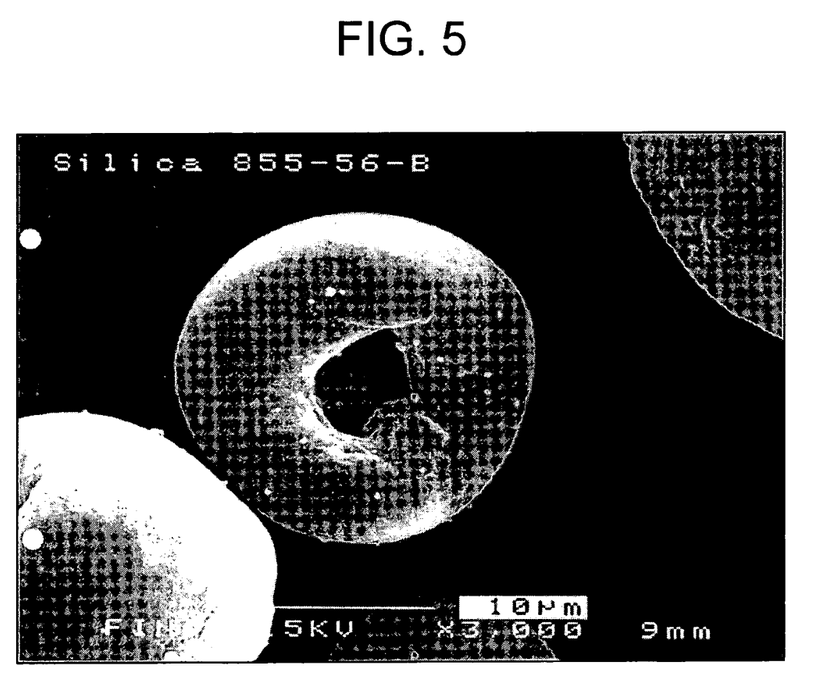

Silica supports of a generally spherical or semi-spherical configuration can be used to support stereospecific metallocenes which produce polymers of reduced numbers of gel imperfections, commonly referred to as "fish eyes." The spherical or semi-spherical silica supports leading to reduced gel imperfections can be nearly perfect spheres as shown in FIGS. 2 and 3, or they may be somewhat irregular semi-spherical in shape having generally axially depressions which sometimes extend completely through the silica particles to provide particles having a toroidal configuration, as shown in FIGS. 4 and 5. When a granular silica support, as shown in FIG. 1, is employed, the gel imperfections, or "fish eyes" in the polymer product can be substantially greater.

In general, the relationships between silica support shapes and geometric values can be demonstrated by the results shown in Table 1 below for the polymerization of propylene with a syndiospecific metallocene, diphenylmethylene(cyclopentadienyl fluorenyl)zirconium dichloride, supported on each of three silica particles denominated herein as Silica Support I, Silica Support II, and Silica Support III.

TABLE 1

| Silica Support | Shape | Surface Area (m2/g) | Pore Volume (ml/g) | Fish Eyes (<200 Microns) |
|---|---|---|---|---|
| I | granular | 525 | 0.73 | 3000 |
| II | spherical | 769 | 0.90 | 1500 |
| III | semi-spherical | 324 | 1.45 | 45 |

While the metallocenes supported on Silica Support III prove to be highly effective in decreasing gel imperfections in the resulting polymer product, this has been found to be attended by a significant desorption of the metallocene from the support under polymerization conditions. As described in greater detail below, such desorption with the resultant fouling of the polymerization reactor can be avoided by employing supports having a relatively narrow pore volume distribution which show a good retention of metallocenes on the support after aging in the presence of a tri-isobutylaluminum co-catalyst.

The character of the supported metallocene in resisting desorption from the silica support during the polymerization reaction can be characterized in terms of the retention factor of the metallocene on the support after aging in tri-isobutylaluminum for 12 hours at a temperature of 25° C. By the term "retention factor," it is meant that the percentage amount of metallocene remaining on the support after the supported metallocene, aged as described above, is slurried in a mineral oil containing 25 wt. % TIBAL with the supported metallocene present in the TIBAL/hexane solution in an amount of one part by weight supported metallocene to one part by weight of TIBAL. Thus, during the slurry procedure, if 5 wt. % of the metallocene is desorbed from the support, the supported metallocene can be characterized as having a retention factor of 95 wt. %. While TIBAL is used in measuring the retention factor for the metallocene in the support, it is to be understood that this does not dictate its use as a co-catalyst. During polymerization, other organoaluminums such as triethylaluminum, trimethylaluminum, or various organoaluminum halides can also be used as co-catalysts. As a practical matter, however, it will often be preferred to employ tri-isobutylaluminum as the co-catalyst during the polymerization reaction.

The retention factor for the supported metallocenes used in the present invention should be at least 90% and more preferably at least 95%. By retaining a very high percentage of metallocene on the support, fouling of the polymerization reactor can be minimized or avoided altogether.

The particulate silica supports employed in the present invention comprise granular or spheroidal silica particles having an average particle size within the range of about 10–40 microns. The metallocene catalyst can be primarily supported within the pore surface area of the silica, as contrasted with the external surface area, with the amount of metallocene supported externally of the silica particle accounting for a minor fraction, usually no more than 10 wt. % of the total metallocene found on the silica support. Stated otherwise, a major fraction of more than 50% and preferably at least 90 wt. % of the metallocene can be contained within the pore volume of the silica support. An improved polymer characterized in terms of reduced gel defects is observed for catalysts supported on relatively high surface area, small particle size spherical particles having an average particle size of about 10–25 microns. While these solid spheres result in substantially better polymers than those produced by metallocene supported on the more conventional, irregular particulate silica, even better results in terms of gel imperfections are obtained employing silica supports of the toroidal semispherical configuration. This substantially-reduced number of gel defects is accomplished not withstanding that the toroidal silica has a somewhat larger average particle size than the solid spheroidal silica. It is postulated that the spheroidal silica particles become highly fractured during the polymerization procedure. The fracturing of the spheroidal silica particles exposes more active transition metal sites to the polymerization mechanism and also reduces the silica particles to smaller sizes that do not result in significant numbers of gel defects. Thus, the toroidal silica particles, while larger than the more perfectly formed spheroidal silica particles, are believed ultimately to fracture to a size of about five microns or less, usually about three microns or less, resulting in a significant reduction in gel imperfections. While silica supports of the toroidal configurations are thus effective in terms of reduced gel imperfection, they also are subject to desorption of the metallocene catalyst during the polymerization procedure. The relatively solid spheroidal particles, which more nearly approach being perfect spheres, still result in substantial reduction in gel imperfections without desorption of the metallocene during the polymerization procedure. Both the spheroidal silica particles and the granular silica particles provide effective supports for both isospecific and syndiospecific metallocenes without deleterious desorption of the metallocene so long as relatively narrow pore size distribution parameters are met.

The metallocenes employed in the present invention may be isospecific or syndiospecific catalysts, as described previously, and the invention will be described with regard to formation of syndiotactic polyolefins, specifically syndiotactic polypropylene. The term "metallocene," as used herein and in accordance with normal art usage, denotes an organometallic coordination compound in which two cyclo-$C_5$ ligands (cyclopentadienyl or substituted cyclopentadienyl rings) are bonded to a central or "sandwiched" metal atom which may be provided by a transition metal halide, alkyl, alkoxy, alkoxy halide or the like. Such structures are sometimes referred to as "molecular sandwiches" since the cyclo-$C_5$ ligands are oriented above or below the plane of the central coordinated metal atom. The metallocene catalysts which are supported in accordance with the present invention may be neutral or they may be cationic. By the term "cationic metallocene," it is meant a metallocene in which the central coordinated metal atom carries a positive charge, that is, the metallocene complex is a cation associated with a stable anion. The neutral or cationic metallocenes employed in accordance with the present invention are stereorigid. Preferably, stereorigidity is imported to the ligand structure by virtue of a chemical bridge extending between the cyclopentadienyl (or substituted cyclopentadienyl) rings.

As noted previously, U.S. Pat. No. 4,892,851 discloses the preparation of syndiotactic polypropylene or other polyolefins through the use of bridged stereorigid metallocene catalysts. The aforementioned U.S. Pat. No. 5,225,500 discloses stereorigid metallocene catalysts, including those in which stereorigidity is imparted by a bridge structure, in which a neutral metallocene is ionized to provide a stable cationic catalyst. Neutral metallocenes may also be converted to the cationic form following procedures of the type disclosed in the aforementioned U.S. Pat. Nos. 5,243,002 and 5,205,500 and also in European Patents 277,003 and 277,004 to Turner, and further by a process employing a triphenylcarbenium boronate as discussed in greater detail in U.S. Pat. No. 5,387,568 to Ewen et al. or a triphenylcarbenium aluminate as disclosed in U.S. Pat. No. 5,763,549 Elder et al. In the bridged metallocene catalysts employed in the present invention, the cyclopentadienyl groups may be the same if they are to be used for isotactic polymer propagation, or different if they are to be used for syndiotactic polymer propagation.

As noted previously, one application of the present invention is in the use of supported syndiospecific catalysts having a stereorigid bridge structure extending between dissimilar cyclopentadienyl rings. Such syndiospecific metallocenes may be characterized by the previously described formula (7):

$$R''(CpR_n)(CpR'_m)MeQ_k \quad (7)$$

In Formula (7), R and R' are selected such that $CpR'_m$ is a sterically different ring than $CpR_n$. Isospecific catalysts employed in accordance with the present invention may also be characterized by formula (7), with the proviso that the two cyclopentadienyl groups, which may be substituted or unsubstituted, are chemically the same, that is, $C_pR'_m$ is the same as $C_pR_n$ and m and n may both vary from 0 to 4. Such isospecific catalysts can be characterized by the formula:

$$R''(C_5R'_4)_2MeQ_k \quad (10)$$

corresponding to formula (6) above except that Me is a transition metal not limited to hafnium, and more specifically by the formula:

$$R''(Ind)_2MeQ_k \quad (11)$$

wherein Ind is an indenyl or substituted indenyl group in a racemic configuration.

The stereorigid metallocene catalysts employed in the present invention may be neutral or cationic metallocenes. The cationic metallocenes correspond to the structures depicted by formulas (7) and (10) with the exception that k is an integer from 0 to 2, rather than the transition metal being possibly trisubstituted, as in the case of the neutral metallocenes. Such cationic metallocene catalysts may be characterized by the following formula:

$$[R''CpR_n)(CpR'_m)MeQ_k]^+P^- \quad (12)$$

In Formula (12), Cp, R, R', Me, m, and n are as described previously, k is a number from 0 to 2, and P is a stable non-coordinating counter anion. The cationic catalysts of Formula (12) may be prepared from the corresponding neutral metallocenes using procedures as described above.

The counter anion indicated by P in Formula (12) is a compatible non-coordinating anion which may be of the type described in the aforementioned Elder et al. and Razavi U.S. patents or the Turner European patents. The anion P either does not coordinate with the metallocene cation or is only weakly coordinated to the cation, thereby remaining sufficiently liable to be displaced by a neutral Lewis base. As described in the Turner patents, the term "compatible non-coordinating anion" identifies an anion which, when functioning as a stabilizing anion in the metallocene catalyst system, does not transfer an anionic substituent or fragment thereof to the cation to form a neutral metallocene and boron byproduct or other neutral metal or metalloid byproduct, as the case may be. Suitable non-coordinating anions include: $[W(PhF_5)]—$, $[Mo(PhF5)—]$ (wherein $PhF_5$ is pentafluoryl phenyl), $[ClO_4]—$, $[SbR_6]—$, and $[AlR_4]—$ (wherein each R is independently Cl, a $C_1–C_5$ alkyl group, preferably, a methyl group, an aryl group, e.g., a phenyl or substituted phenyl group, or a fluorinated aryl group. For a further description of compatible non-coordinating anions and their associated cations which may be employed in the present invention, reference is made to U.S. Pat. Nos. 5,225,500, 5,243,002, 5,387,568, and 5,763,549; and European Pat. Nos. 277,003 and 277,004, the entire disclosures of which are incorporated herein by reference.

The silica-supported bridged metallocene catalysts of the present invention may be isospecific or syndiospecific, as discussed previously. The bridge configuration of the R'' structural bridge is controlled by the terminal carbon substituents of the substituted fulvene. For example, where the fulvene reactant is 6,6-dimethyl fulvene, the structural bridge will be a $C_3$ alkylene group, commonly referred to as propylidene. The use of 6,6-methylethyl fulvene will result in a $C_4$ structural bridge, and the use of 6,6-diethyl fulvene as a reactant will result in a $C_5$ structural bridge. The use of 6,6-diphenyl fulvene will result in a diphenyl methylene bridge. Where the bridge is a hydrocarbyl group, it is preferably selected from the group consisting of alkyl radicals having 3–6 carbon atoms, more preferably, 3–5 carbon atoms. Examples of alkyl bridges include propyl, butyl, and pentyl bridges which may be substituted or unsubstituted. Me in formula (12), preferably is a Group 4 or 5 metal, and more preferably a Group 4 metal, specifically titanium, zirconium, or hafnium. Vanadium is the most suitable of the Group 5 metals. Q will usually be a methyl or ethyl group or chlorine.

Where the present invention is employed in the production of syndiotactic polymers, the cyclopentadienyl and substituted fulvene reactants are chosen so that the resulting syndiospecific catalysts exhibit bilateral symmetry of the metallocene ligands when viewed as planar projections of the cyclopentadienyl groups. By the term "bilateral symmetry," as used herein, it is meant the symmetry of the ligand as viewed through the axes of the substituted or unsubstituted Cp groups, as shown above by formula (8). For example, the reaction of fluorene with 6,6-dimethyl fulvene produces the isopropylidene(cyclopentadienyl-1-fluorenyl) ligand which exhibits such bilateral symmetry. However, the similar reaction carried out with a ring substituted fulvene, such as 3-alkyl-6,6-dimethyl fulvene, would result in a corresponding structure, but with the cyclopentadienyl group substituted at the three position. This structure would not exhibit bilateral symmetry as shown above by formula (9). The ligand with two identical substituents at the 3 and 4 positions on the cyclopentadienyl group would have bilateral symmetry.

Usually, in the metallocenes employed in the present invention, Me is titanium, zirconium, hafnium or vanadium; Q is, preferably a methyl or halogen, more preferably chorine; and k, preferably, is 2 for neutral metallocenes and 1 for cationic metallocenes, but may vary with the valence of the metal atom. Exemplary hydrocarbyl radicals include methyl, ethyl, propyl, isopropyl, butyl, isobutyl, amyl, isoamyl, hexyl, heptyl, octyl, nonyl, decyl, cetyl, phenyl, and the like. Other hydrocarbyl radicals include other alkyl, aryl, alkenyl, alkylaryl, or arylalkyl radicals. Further, Rn and R"m may comprise hydrocarbyl radicals attached to a single carbon atom in the Cp ring, as well as radicals that are bonded to two carbon atoms in the ring as in the case of a fluorenyl. Neutral metallocenes may be converted to the cationic state following procedures as described previously. Exemplary neutral syndiospecific metallocenes which may be employed in the present invention are isobutyldiene (cyclopentadienyl-1-fluorenyl), zirconium dimethyl, isopentyldiene (cyclopentadienyl-1-fluorenyl)zirconium dimethyl, isopropylidene(indenyl) (cyclopentadienyl) zirconium dimethyl, isopropylidene(cyclopentadienyl-1-fluorenyl)zirconium dimethyl, diphenyl methylene(cyclopentadienyl-1-fluorenyl)zirconium dimethyl, and the corresponding dichlorides or methylchlorides.

Examples of isospecific neutral metallocenes which can be employed in accordance with the present invention include isopropylidene bis(2,3 dimethylcyclopentadienyl) zirconium dimethyl, isopropylidene bis(tetramethylcyclopentadienyl) zirconium dimethyl, and isopropylidene bis(2,4 dimethylcyclopentadienyl) zirconium dimethyl, ethylene bis (indenyl)zirconium dimethyl and the corresponding dichlorides. Further neutral metallocenes include ethylene bis(2-methyl indenyl) zirconium dichloride, dimethyl silyl bis(2-methyl indenyl) zirconium dichloride, diphenyl silyl bis(2-methyl indenyl) zirconium dichloride, diphenyl silyl bis(2-methyl, 4-phenyl-indenyl) zirconium dichloride, and diethyl silyl bis(2-methyl, 4-phenyl indenyl) zirconium dichloride. Other corresponding metallocenes, especially the corresponding hafnium and titanium metallocenes, can also be employed in accordance with the present invention to produce syndiospecific or isospecific catalysts. Similarly, other metallocene dialkyls, for example, such as the zirconium or hafnium diethyls and other dihalides, may also be made following the present invention, but, as a practical matter, the neutral metallocenes will be in the form of dimethyl or dichloride compounds, and the metallocenes will usually be in the form of the chlorides.

The supported metallocenes used in the present invention can be prepared by any suitable technique. Procedures known in the prior art for preparing silica-supported metallocene catalysts can be used in preparing the supported metallocenes of the present invention with the exception that the support takes the form of either granular or spheroidal silica particles having the geometric characteristics called for in the present invention. Thus, procedures such as those disclosed in the aforementioned U.S. Pat. No. 5,308,811 to Suga et al. and U.S. Pat. No. 5,444,134 to Matsumoto et al. may be employed in forming the supported catalysts of the present invention with the exception of the surface area and pore size criteria specified in these references. In employing the procedures of this nature, the catalyst components, i.e., the organoaluminum compound and the silica support can be mixed together in any order or contacted simultaneously as disclosed, for example, in the Suga et al. and Matsumoto references. For a further description of such procedures, reference is made to U.S. Pat. Nos. 5,308,811 to Suga et al. and 5,444,134 to Matsumoto et al., the entire disclosures of which are incorporated herein by reference.

Preferably where a so-called neutral metallocene is employed it is desirable to first treat the silica support material with an alkylalumoxane co-catalyst such as methylalumoxane (MAO) with subsequent contact of alumoxane treated support with the metallocene. Subsequent to contact of the molecular support with the alumoxane and metallocene, a co-catalyst such as trimethylaluminum, triethylaluminum or tri-isobutylaluminum (TIBAL) can be added to the silica-supported catalyst and the catalyst then used in the polymerization reaction.

In experimental work carried out respecting the present invention, a syndiospecific metallocene catalyst, diphenylmethylene(cyclopentadienyl fluorenyl)zirconium dichloride, was used in the polymerization of propylene as a supported catalyst on three different silica supports. Similar polymerizations were carried out with an isospecific catalyst, dimethylsilylbis(2-methyl, 4-phenyl indenyl)zirconium chloride. In this case, methylalumoxane (MAO) was used as the co-catalyst component ionizing agent, and TIBAL was used as a co-catalyst scavenging agent.

Three silica supports as characterized in Table 1 were used in experimental work respecting the invention. The first, identified in Table 1 as Silica Support I, was an amorphous silica of irregular angular particles of an average particle size of about 35–40 microns with a surface area of about 525 $m^2$/g. and a pore volume of about 0.73 ml/g. A photograph of particles of Support I, shown to an enlargement of 100×, is illustrated in FIG. 1.

The second silica support, Silica Support II, was a highly spherical silica. This support has an average particle size of 12 microns, a surface area of about 769 m²/g and a pore volume of about 0.9 ml/g. The third support, Silica Support III, was a semi-spheroidal silica having in some instances a toroidal configuration. This support had a larger average particle size and a correspondingly lower surface area than the silica having the more nearly-perfect spheroidal configuration, as exemplified by Silica Support II. Silica Support III had an average particle size of 25 microns, a surface area of about 324 m²/g. and a pore volume of 1.45 ml/g.

Actual photographs of silica particles having the spherical configuration of Silica Support II or the semispherical or toroidal configuration of Silica Support III are shown in FIGS. 2–5. As shown in FIGS. 2 and 3, the silica particles conforming to Silica Support II are, in fact, very nearly conformed to almost perfect spheres having in some cases minor imperfections on the outer surface as shown in FIG. 3 and in other cases being relatively free of such imperfections. The silica particles are shown in FIG. 2 with a magnification of 1,000× and in FIG. 3 with a magnification of 5,000×.

Photographs of silica particles of Silica Support III are shown in FIG. 4 at a magnification of 2000×, and in FIG. 5 at a magnification of 3,000×. As shown in FIG. 4, the silica particles of Silica Support III conform in some cases to nearly perfect spheres (with the central-recess or bore providing the toroidal configuration) to highly irregular configurations which tend to be, in some cases, ellipsoidal and highly fragmented. FIG. 5 shows silica particles of Silica Support III which generally are of a toroidal configuration with only minor imperfections on the surfaces.

Figure 6:
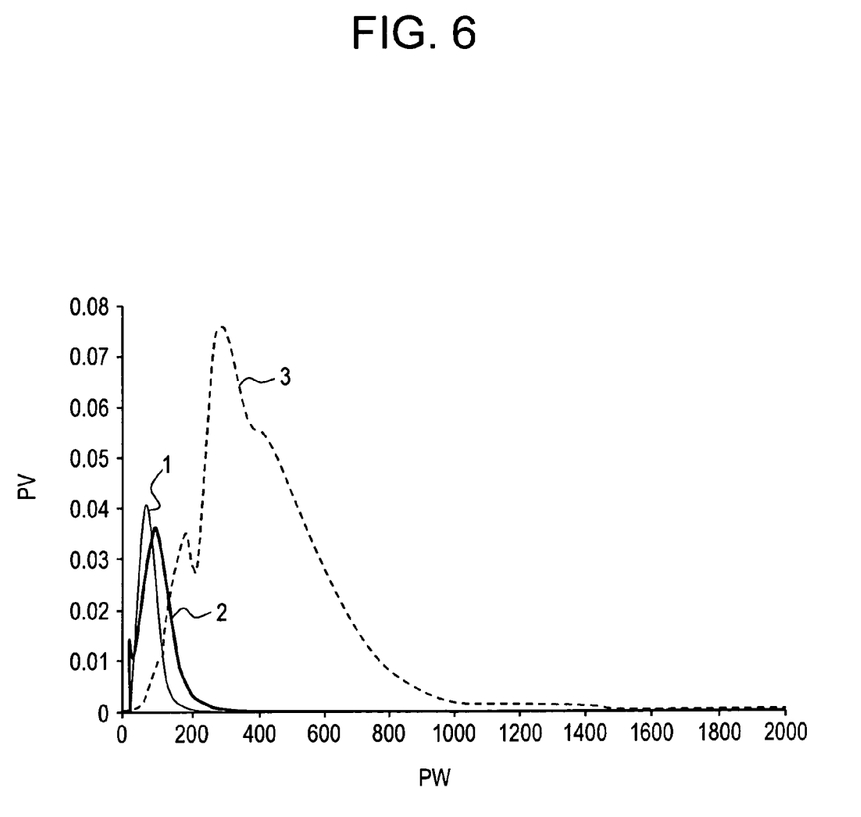
FIG. 6 is a graph showing pore size distribution for Silica Support I, II, and III in terms of differential pore volume plotted on the ordinate versus pore width on the silica supports plotted on the abscissa.

Turning now to FIG. 6, there is illustrated a graph showing the pore size distribution of each of the Silica Supports I, II, and III in terms of differential pore volume versus pore width. More specifically, and as shown in FIG. 6, the support pore volume PV in cm³/g is plotted on the ordinate versus the pore width PW in angstroms plotted on the abscissa. Curve 1 indicates the pore size distribution for Silica Support I; curve 2, the pore size distribution for Silica Support II; and curve 3, the pore size distribution for Silica Support III. As can be seen for Silica Supports I and II, substantially all of the pore volume distribution occurs within a range having a maximum pore width of no more than 300 angstroms. For each of Supports I and II, the pore volume maxima correlates with a pore size of less than 200 angstroms occurring at about 90 angstroms for Support I and about 100 angstroms for Support II. For Support III, on the other hand, the pore volume maxima occurs at about 280 angstroms, and substantial pore volume occurs at a pore widths as high as 500 to 1,000 angstroms.

The three silica supports described above were treated with methylalumoxane and then treated with the isospecific or syndiospecific metallocene catalysts. A solution of methyl alumoxane was added to the silica particles and stirred in refluxed toluene for a period of four hours at 116° C. The weight ratio of MaO to the silica support was in each case within the range of about 0.7–0.9. The MaO-treated silica was then recovered from the toluene solution by filtering, washed three times with toluene, and dried at room temperature over night. A syndiospecific metallocene, diphenylmethylene(cyclopentadienylfluorenyl)zirconium dichloride or an isospecific metallocene, dimethylsilylbis(2-methyl-4-phenyl indenyl) zirconium dichloride, was then added to the silica support in an amount of about 2 wt. % metallocene based upon the silica and stirred at room temperature. The solid product was then filtered and washed with hexane at room temperature and dried under vacuum.

The syndiospecific or isospecific-supported metallocenes were then aged in the presence of tri-isobutyl aluminum (TIBAL) in a 25% hexane solution. The aging procedure involved contacting equal parts of the supported metallocene and equal parts of the TIBAL in a mineral oil slurry and allowing them to stand at room temperature, 25° C., for an overnight period (about 12 hours) prior to polymerization. A typical master batch of the syndiospecific catalyst or the isospecific catalyst was prepared from a slurry of 180 mg of the supported metallocene (the metallocene and the support), 8.3 ml of mineral oil, and 180 mg of TIBAL in a concentration of 25 wt. % in hexane. After the overnight aging procedure, a 1.0 ml aliquot of the master slurry was used for each propylene polymerization. The polymerization work as carried out with the metallocenes treated with the TIBAL aging procedure was compared with the polymerization of propylene using the metallocenes on the various supports using TIBAL as a co-catalyst, but without aging. The activity in terms of grams of polymer per gram of catalyst per hour for the syndiospecific-supported metallocene and the isospecific-supported metallocene are illustrated below in Tables 2 and 3, respectively.

TABLE 2 s-PP Catalyst

| Silica Support | Activity Before Aging in TIBAL (g Pol./g · cat./h) | Activity After Aging Overnight in TIBAL (g Pol./g · cat./h) |
|---|---|---|
| I | 8000 | 10000 |
| II | 8000 | 16000 |
| III | 10000 | 12000 |

TABLE 3

M-iPP Catalyst

| Silica Support | Activity Before Aging in TIBAL (g Pol./g · cat./h) | Activity After Aging Overnight in TIBAL (g Pol./g · cat./h) |
|---|---|---|
| I | 5000 | 8000 |
| II | 4000 | 13000 |
| III | 6000 | 10000 |

As indicated by the experimental work reported in Tables 2 and 3, aging of the supported catalysts in the TIBAL overnight substantially increased the activity of both the syndiospecific and isospecific catalysts supported on each of the Silica Supports I, II, and III. However, for both the syndiospecific and isospecific metallocenes supported on the Silica Support III, the polymerization runs were accompanied by fouling, sometimes referred to as skimming, in the reactors for the supported metallocenes aged overnight with the TIBAL. The fouling observed was similar to that observed when using unsupported metallocenes in polymerization with polymer collecting on the walls of the reactor and stirrer. This supports the conclusion that the metallocene supported on Silica Support III after the TIBAL aging procedure was coming off the support and acting similar in the manner of an unsupported metallocene.

Further experimental work verified that the fouling in the reactor for the metallocene supported on Silica Support III was due to the metallocene desorbing off of the support during the polymerization runs. In this experimental work the isospecific metallocene supported on Silica Support III was slurried in toluene with equal amounts of TIBAL by weight. The slurry was aged for two hours at which time the slurry color was observed to change from light red to reddish brown. The slurry was allowed to settle and the supernatural liquid was removed. The remaining solids were washed with hexane and dried under and vacuum at room temperature. The metallocene desorbed from the Silica Support III was used in solution as a polymerization catalyst, and it was found to function in a manner to produce a polymer which is similar to the polymer obtained with unsupported metallocene. A similar procedure was followed with the syndiospecific catalyst of Silica Support II. The filtrate of the aged catalyst employing the syndiospecific metallocene on Silica Support II was found to be clear and colorless with no evidence of metallocene desorption Having described specific embodiments of the present invention, it will be understood that modifications thereof may be suggested to those skilled in the art, and it is intended to cover all such modifications as fall within the scope of the appended claims.

What is claimed:

1. A supported metallocene catalyst comprising:
   silica particles having an average particle size within the range of 20–40 microns, an average effective pore size within the range of 50–200 angstroms, and a differential pore size distribution of a pore volume of at least 0.01 cm³/g within the range of no more than 300 angstroms; and
   a stereospecific metallocene supported on said particulate support wherein the metallocene ligand structure having two sterically dissimilar cyclopentadienyl ring structures coordinated with a central transition metal atom; at least one of said cyclopentadienyl ring structures being a substituted cyclopentadienyl group which provides an orientation with respect to said transition metal atom which is sterically different from the orientation of the other cyclopentadienyl group with respect to said transition metal atom, both of said cyclopentadienyl groups being in a relationship with each other providing a stereorigid relationship relative to said coordinating transition metal atom to prevent rotation of said ring structures; and
   said metallocene ligand structure having a kinetic diameter which is less than the average pore size of said silica and being carried within the interior pore volume of said silica particles to provide at least 50% of the polymerization sites provided on said transition metal atom being within the interior pore volume of said support, wherein said metallocene is aged in tributylaluminum at a temperature of 25° C. for a period of 12 hours and has a retention factor on said support of at least 90% after aging.

2. The supported metallocene catalyst of claim 1 comprising spheroidal silica particles having an average diameter within the range of 10–25 microns.

3. The supported metallocene catalyst of claim 1 further comprising an aluminum-containing co-catalyst incorporated into said particulate silica support wherein said aluminum-containing co-catalyst is incorporated predominantly within the interior of said particulate support.

4. The composition of claim 1 wherein said stereospecific metallocene is characterized by the formula:

wherein $Cp_a$ is a substituted cyclopentadienyl ring, $Cp_b$ is an unsubstituted or substituted cyclopentadienyl ring; each R is the same or different and is a hydrocarbyl radical having 1–20 carbon atoms; each $R'_m$ is the same or different and is a hydrocarbyl radical having 1–20 carbon atoms; R" is a structural bridge between the cyclopentadienyl rings imparting stereorigidity to the catalyst and is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal from the Periodic Table of Elements; each Q is a hydrocarbyl radical having 1–20 carbon atoms or is a halogen; $0 \leq p \leq 3$; $0 \leq m \leq 4$; $1 \leq n \leq 4$; and wherein $R'_m$ is selected such that $(Cp_b R'_m)$ is a sterically different ring than $(CP_a R_n)$.

5. The composition of claim 4 wherein R is selected such that $(Cp_a R_n)$ forms a substituted or unsubstituted fluorenyl group.

6. The composition of claim 4 wherein $R"(CpR_n)(CPR'_m)$ forms an isopropylidene(cyclopentadienyl-1-fluorenyl) radical or a diphenylmethylene(cyclopentadienyl-1-fluorenyl) radical.

7. In a process for the preparation of a supported metallocene catalyst, the steps comprising:
   providing a particulate comprising silica particles having an average particle size within the range of 20–40 microns, an average effective pore size within the range of 50–200 angstroms, and a differential pore size distribution of a pore volume of at least 0.01 cm³/g within the range of no more than 300 angstroms;
   contacting said particulate silica support with an oleaginous solution of an alumoxane co-catalyst in an oleaginous carrier liquid in an amount sufficient to incorporate said alumoxane catalyst within the pore spaces of said silica support;
   drying said alumoxane-impregnated silica support to remove oleaginous carrier liquid therefrom to leave an alumoxane residue within the pore spaces of said support;
   thereafter contacting said alumoxane-containing silica support with a stereospecific metallocene having two sterically dissimilar cyclopentadienyl ring structures coordinated with a central transition metal atom being in a stereorigid relationship relative to said coordinating transition metal atom to prevent relative rotation of such ring structures and to form a supported metallocene catalyst; and
   aging the supported metallocene catalyst in tributylaluminum at a temperature of 25° C. for a period of 12 hours, wherein the supported metallocene catalyst has a retention factor on said support of at least 90% after aging.

* * * * *